United States Patent
Hwang et al.

(10) Patent No.: US 11,544,263 B2
(45) Date of Patent: *Jan. 3, 2023

(54) DYNAMIC QUERY EXECUTION USING ESTIMATED EXECUTION TIME

(71) Applicant: Snowflake Inc., Bozeman, MT (US)

(72) Inventors: Sangyong Hwang, Sammamish, WA (US); Sourav Sikdar, Houston, TX (US); Li Yan, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,468

(22) Filed: Mar. 31, 2022

(65) Prior Publication Data

US 2022/0245148 A1      Aug. 4, 2022

Related U.S. Application Data

(63) Continuation of application No. 17/236,471, filed on Apr. 21, 2021, now Pat. No. 11,314,740.

(Continued)

(51) Int. Cl.
*G06F 16/245* (2019.01)
*G06F 16/2453* (2019.01)
(Continued)

(52) U.S. Cl.
CPC .... *G06F 16/24542* (2019.01); *G06F 11/3419* (2013.01); *G06F 16/24549* (2019.01);
(Continued)

(58) Field of Classification Search
None
See application file for complete search history.

(56) References Cited

U.S. PATENT DOCUMENTS 6,356,887 B1 *  3/2002  Berenson .......... G06F 16/24524
6,985,904 B1 *  1/2006  Kaluskar .......... G06F 16/24539
                                                707/999.102

(Continued)

OTHER PUBLICATIONS

"U.S. Appl. No. 17/236,471, Final Office Action dated Nov. 3, 2021", 15 pgs.

(Continued)

*Primary Examiner* — Son T Hoang
(74) *Attorney, Agent, or Firm* — Schwegman Lundberg & Woessner, P.A.

(57) ABSTRACT

The subject technology receives a first query plan corresponding to a first query, the first query plan comprising a new query plan different than a previous query plan for the first query. The subject technology determines a value indicating an estimated improvement in execution time of the first query plan in comparison to a previous execution time of the previous query plan. The subject technology, in response to determining that the value is greater than a threshold value, attempting to execute the first query using the first query plan, the attempting comprising determining that a second query plan selected among a plurality of query plans has a second estimated execution time that is less than an estimated execution time of the first query plan, and executing the first query at a subsequent time using the second query plan.

30 Claims, 9 Drawing Sheets

Related U.S. Application Data

(60) Provisional application No. 63/143,671, filed on Jan. 29, 2021.

(51) Int. Cl.
  *G06F 11/34* (2006.01)
  *G06F 16/2455* (2019.01)

(52) U.S. Cl.
  CPC .... *G06F 16/24565* (2019.01); *G06F 2201/80* (2013.01); *G06F 2201/81* (2013.01)

(56) References Cited

U.S. PATENT DOCUMENTS

| | | | |
|---|---|---|---|
| 2006/0136396 A1* | 6/2006 | Brobst | G06F 16/24549 |
| 2006/0212429 A1 | 9/2006 | Bruno et al. | |
| 2009/0100004 A1* | 4/2009 | Andrei | G06F 16/2453 |
| 2010/0306188 A1 | 12/2010 | Cunningham et al. | |
| 2011/0029508 A1 | 2/2011 | Al-omari et al. | |
| 2011/0313999 A1 | 12/2011 | Bruno et al. | |
| 2012/0144234 A1 | 6/2012 | Clark et al. | |
| 2014/0095475 A1* | 4/2014 | Su | G06F 16/24542 707/718 |
| 2016/0092599 A1 | 3/2016 | Barsness et al. | |
| 2018/0046675 A1 | 2/2018 | Zhou et al. | |
| 2022/0050843 A1* | 2/2022 | Hu | G06F 16/24524 |

OTHER PUBLICATIONS

"U.S. Appl. No. 17/236,471, Non Final Office Action dated Jul. 6, 2021", 16 pgs.

"U.S. Appl. No. 17/236,471, Notice of Allowance dated Feb. 25, 2022", 24 pgs.

"U.S. Appl. No. 17/236,471, Response filed Feb. 2, 2022 to Final Office Action dated Nov. 3, 2021", 14 pgs.

"U.S. Appl. No. 17/236,471, Response filed Oct. 4, 2021 to Non Final Office Action dated Jul. 6, 2021", 14 pgs.

* cited by examiner

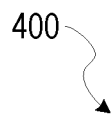

400

RECEIVE A FIRST QUERY PLAN CORRESPONDING TO A FIRST QUERY
402

DETERMINE A SET OF CONSTANTS INCLUDED IN THE FIRST QUERY
404

IDENTIFY A SECOND QUERY PLAN, CORRESPONDING TO A SECOND QUERY
406

EXECUTE THE FIRST QUERY USING THE FIRST QUERY PLAN
408

DETERMINE THAT A FIRST EXECUTION TIME OF THE FIRST QUERY IS GREATER THAN A SECOND EXECUTION TIME OF THE SECOND QUERY
410

CEASE THE EXECUTION OF THE FIRST QUERY
412

EXECUTE THE FIRST QUERY USING THE PREVIOUS QUERY PLAN
414

```
RECEIVE A FIRST QUERY PLAN CORRESPONDING TO A FIRST QUERY, THE
FIRST QUERY PLAN COMPRISING A NEW QUERY PLAN DIFFERENT THAN
        A PREVIOUS QUERY PLAN FOR THE FIRST QUERY
                            502
                             │
                             ▼
  DETERMINE A VALUE INDICATING AN ESTIMATED IMPROVEMENT IN
   EXECUTION TIME OF THE FIRST QUERY PLAN IN COMPARISON TO A
     PREVIOUS EXECUTION TIME OF THE PREVIOUS QUERY PLAN
                            504
                             │
                             ▼
   DETERMINE THAT THE VALUE IS GREATER THAN A THRESHOLD VALUE
                            506
                             │
                             ▼
  IN RESPONSE TO THE VALUE BEING GREATER THAN THE THRESHOLD
    VALUE, EXECUTE THE FIRST QUERY USING THE FIRST QUERY PLAN
                            508
```

DURING EXECUTING THE FIRST QUERY, DETERMINE THAT A CURRENT EXECUTION TIME IS GREATER THAN THE PREVIOUS EXECUTION TIME OF THE PREVIOUS QUERY PLAN
602

IN RESPONSE TO DETERMINING THAT THE CURRENT EXECUTION TIME IS GREATER THAN THE PREVIOUS EXECUTION TIME, CEASE EXECUTION OF THE FIRST QUERY
604

PERFORM A ROLLBACK OPERATION TO SWITCH BACK TO THE PREVIOUS QUERY PLAN FOR A SUBSEQUENT EXECUTION OF THE FIRST QUERY
606

INCREASE THE THRESHOLD VALUE IN RESPONSE TO PERFORMING THE ROLLBACK OPERATION
608

DETERMINE A FIRST SET OF CONSTANTS IN THE FIRST QUERY PLAN
702

DETERMINE A SECOND SET OF CONSTANTS IN THE PREVIOUS QUERY PLAN
704

DETERMINE WHETHER DIFFERENCES BETWEEN THE FIRST SET OF CONSTANTS AND THE SECOND SET OF CONSTANTS DECREASE AN ESTIMATED EXECUTION TIME OF THE FIRST QUERY PLAN IN COMPARISON WITH THE PREVIOUS EXECUTION TIME OF THE PREVIOUS QUERY PLAN
706

IN RESPONSE TO DETERMINING THAT THE FIRST SET OF CONSTANTS INCREASE THE ESTIMATED EXECUTION TIME OF THE FIRST QUERY PLAN, PERFORM A ROLLBACK OPERATION TO SWITCH BACK TO THE PREVIOUS QUERY PLAN FOR A SUBSEQUENT EXECUTION OF THE FIRST QUERY
708

*FIG. 7*

DYNAMIC QUERY EXECUTION USING ESTIMATED EXECUTION TIME

CROSS-REFERENCE TO RELATED APPLICATIONS

This application is a Continuation of U.S. patent application Ser. No. 17/236,471, filed Apr. 21, 2021, entitled "Responsive Plan Stability", which claims priority to U.S. Provisional Patent Application Ser. No. 63/143,671, filed Jan. 29, 2021, entitled "Responsive Plan Stability", and the contents of each are incorporated herein by reference in their entireties for all purposes.

TECHNICAL FIELD

Embodiments of the disclosure relate generally to databases and, more specifically, to enabling techniques for responsive query plan stability in an online data system(s).

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

A cloud database is a network-based system used for data analysis and reporting that comprises a central repository of integrated data from one or more disparate sources. A cloud database can store current and historical data that can be used for creating analytical reports for an enterprise based on data stored within databases of the enterprise. To this end, data warehouses typically provide business intelligence tools, tools to extract, transform, and load data into the repository, and tools to manage and retrieve metadata.

When certain information is to be extracted from a database, a query statement may be executed against the database data. A cloud database system processes the query and returns certain data according to one or more query predicates that indicate what information should be returned by the query. The data warehouse system extracts specific data from the database and formats that data into a readable form.

BRIEF DESCRIPTION OF THE DRAWINGS

The present disclosure will be understood more fully from the detailed description given below and from the accompanying drawings of various embodiments of the disclosure.

FIG. 4 is flow diagram illustrating operations of a database system in performing a method, in accordance with some embodiments of the present disclosure.

FIG. 5 is flow diagram illustrating operations of a database system in performing a method, in accordance with some embodiments of the present disclosure.

FIG. 6 is flow diagram illustrating operations of a database system in performing a method, in accordance with some embodiments of the present disclosure.

FIG. 7 is flow diagram illustrating operations of a database system in performing a method, in accordance with some embodiments of the present disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Figure 1:
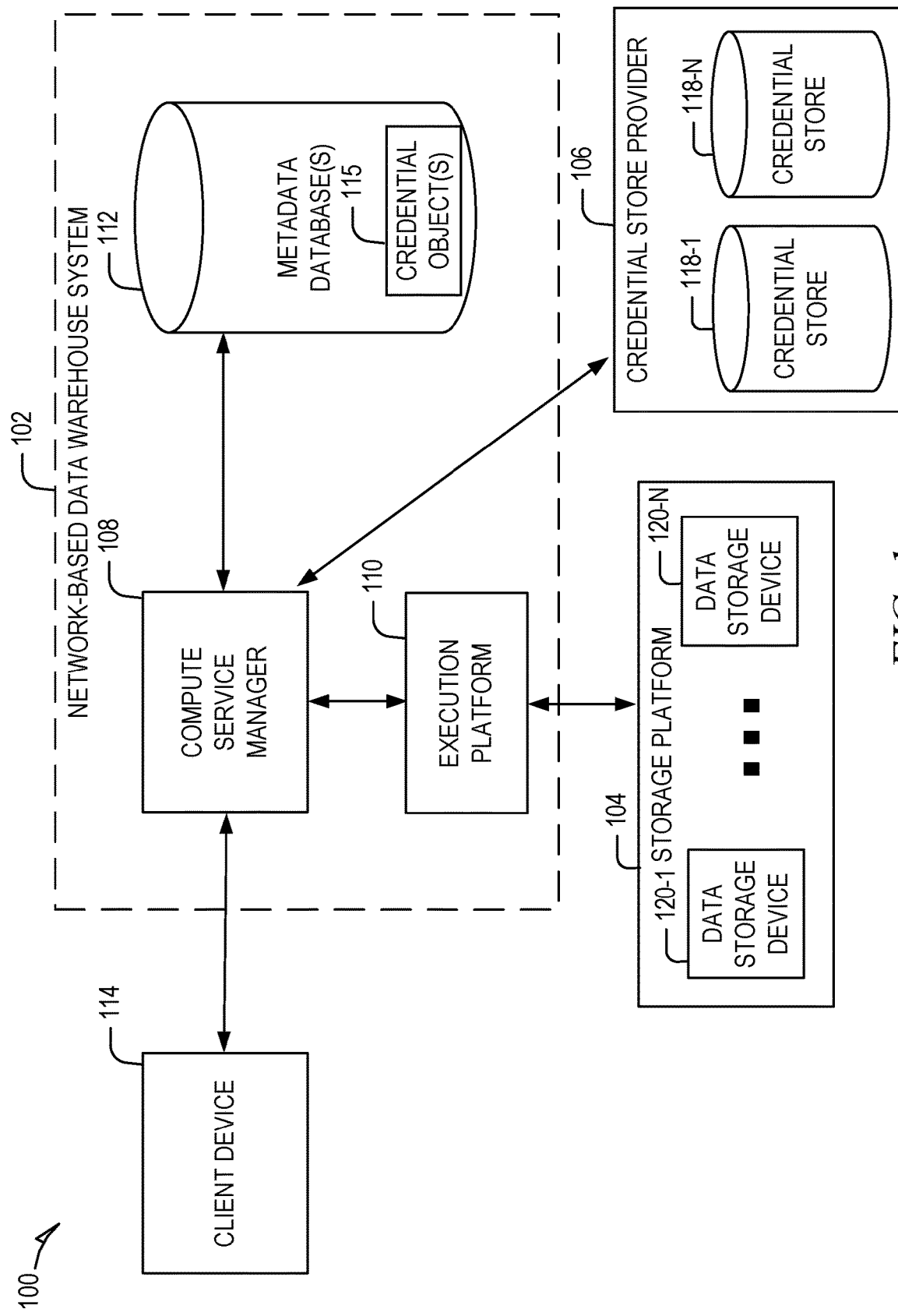
FIG. 1 illustrates an example computing environment that includes a network-based data warehouse system in communication with a cloud storage platform, in accordance with some embodiments of the present disclosure.

FIG. 1 illustrates an example computing environment 100 that includes a database system in the example form of a network-based data warehouse system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based data warehouse system 102 in communication with a cloud storage platform 104 (e.g., AWS®, Microsoft Azure Blob Storage®, or Google Cloud Storage), and a cloud credential store provider 106. The network-based data warehouse system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data warehouse system 102.

The network-based data warehouse system 102 comprises a compute service manager 108, an execution platform 110, and one or more metadata databases 112. The network-based data warehouse system 102 hosts and provides data reporting and analysis services to multiple client accounts.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data warehouse system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based data warehouse system 102 and its users. For example, a metadata database(s) 112 may include a summary of data stored in remote data storage systems as well as data available from a local cache. Additionally, a metadata database(s) 112 may include information regarding how data is organized in remote data storage systems (e.g., the cloud storage platform 104) and the local caches. Information stored by a metadata database(s) 112 allows systems and services to determine whether a piece of data needs to be accessed without loading or accessing the actual data from a storage device.

As another example, a metadata database(s) 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

In an embodiment, a data structure can be utilized for storage of database metadata in the metadata database(s) 112. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML, statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enable the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database(s) 112 includes EP files (expression property files), where each of the EP files store a collection of expression properties about corresponding data. Metadata may be stored for each column of each micro-partition of a given table. In an embodiment, the aforementioned EP files can be stored in a cache provided by the subject system for such EP files (e.g., "EP cache").

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database(s) 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
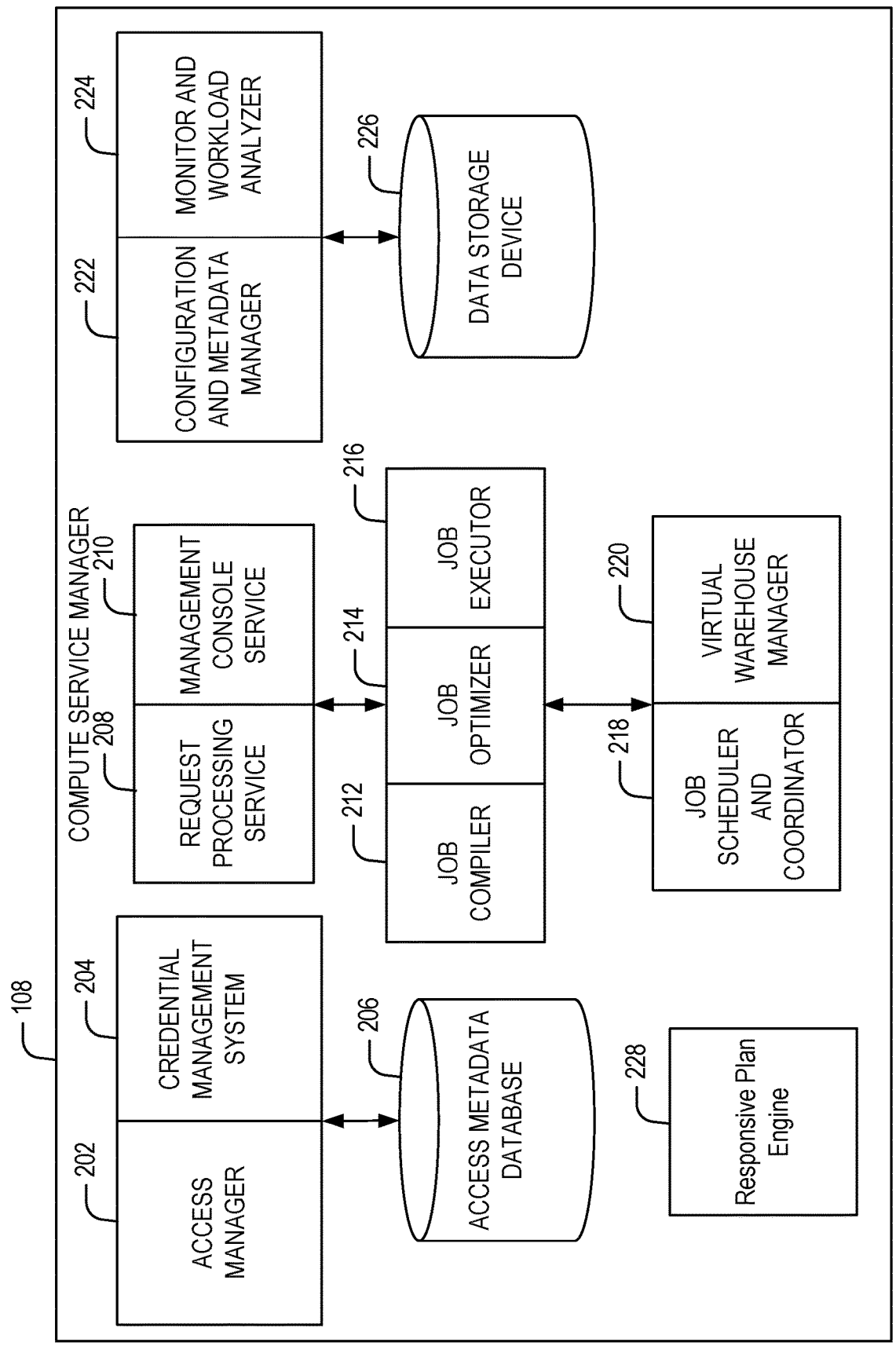
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. Alternatively or conjunctively, the job compiler 212 can generate query plans for executing received queries as discussed further herein.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As further illustrated, the compute service manager 108 includes a responsive plan engine 228. In an example, the responsive plan engine 228 can implement (query) plan stability in a more immediate manner in comparison with existing solutions that may simply freeze plans (e.g., disallowing any modification to the plans).

Embodiments of the responsive plan engine 228 to enable modifying plans to change immediately when there is a statistics change, but with friction so that plans avoid swinging with a "small" statistics change, which involves the following:

In an example, the plan for a query changes with a statistics change(s), but only if the cost with the new plan is less than half the cost with the current one to impose friction to plan changes.

When a new plan is tried (e.g., executed), the execution should finish within the last execution time; otherwise, the execution is canceled and then re-executed with the old (e.g., previous) plan.

If the attempt to change the plan didn't go through, another attempt is tried at a subsequent time if its cost is less than half the cost of the last failed one.

In the description above, the cost and the execution time comparison can be adjusted with a constant factor. The cost comparison can be adjusted to adjust the friction to plan change. The execution time comparison can be adjusted to consider fluctuation in measurement. If the cost of the same plan has been changed since the last execution, the last execution time needs to be scaled as much. The execution time can be compared with the maximum of the last few execution times instead of the last execution time. A plan change can be attempted a few times before it is determined to have failed.

One might think that the latency added with the retry can be avoided if new plans are validated in the background. However, updating plans after background validation are unable to react to sudden statistics changes. The quickest response is from the next execution. It is also more expensive because such a validation may need an additional warming up to exclude the difference from caching effects.

Moreover, the added latency from retry is not expected to be salient. First, the probability of retry is not expected to be high since a plan change is tried only with a significant cost change. Second, the added latency is limited to the last execution time.

The following discussion relates to handling constant values, which may be included in queries.

In some embodiments, for plan stability, the subject system stores a plan per query. More specifically, responsive plan engine 228 decides whether to treat queries that are different only in constant values as the same query or not. In an example, the constant values include not only the ones embedded in the query string but also the ones set by parameter bindings.

The responsive plan engine 228 tries to maintain the required plan stability while not missing the required plan difference at the same time by treating constant value difference as statistics change as follows:

If there is a stored plan matched in an unparameterized way, it is taken as the base plan for the query. In this example, the unparameterized way means the way of treating queries that are different only in constant values as different ones.

Else if there is a stored plan matched in a parameterized way, it is taken as the base plan for the query. In this example, the parameterized way means the way of treating queries that are different only in constant values as the same one.

The plan without plan stability is checked as if it is a new plan with statistics change.

When there are multiple matches in a parameterized way, one way to break the tie could be choosing the one with the closest parameter values. However, the definition of "closest" gets ambiguous with multiple parameters. The subject system uses a simpler heuristic of choosing the one with the closest estimated cost.

The following discussion relates to storing plans for plan stability.

Although the subject system may need to store plans for plan stability, differently from plan caching, the subject system may not need to store the full plan. In an example, the subject system may need to store only join orders because cost-based optimization decides only join orders. Additionally, the subject system may need to store more information if the subject system acquires additional optimizations based on cost estimation. For example, if the subject system implements cost-based Common Table Expression (CTE) inlining in the future, the subject system will need to store the CTE inlininig decision together with join order decisions, making the CTE inlining decision replayable, too.

One benefit of not storing the full plan is that it requires much less storage. Another benefit is that the subject system is free to apply data-dependent optimization. It also allows minor plan changes for correctness fix and enables plan sharing between queries with different constant values. The subject system may need to compile the query to apply the stored join order, but the join ordering part will be much cheaper with it because the expensive cost-based optimization is not needed.

One issue with storing only join orders is that the subject system may not be able to replay the same join order because the join graphs may not be compatible with each other due to a subplan removal by data-dependent optimizations. In an embodiment, the subject system is able to proceed just taking the new plan when such an issue happens, but it will also be beneficial to handle such cases as well. One implementation to address the issue is to make it possible for join orders to be enforced approximately even if there are some missing tables or additional tables. Another implementation postpones data-dependent subplan removal to later phases so that it does not affect join order recording and replaying for plan stability. Since the plan stability information may need to be persistent and shared globally within an account, it will need to be stored or indexed by a given database (e.g., Foundation DB, and the like).

The following discussion relates to handling breaking changes, which may be a result of changes to a given binary or code base associated with the subject system.

When there is such a breaking change to a binary or code base for the subject system e.g., that makes plan stability fail to work, the following can be applied to avoid not breaking or worsening plan stability:

If there are pending breaking changes that are not yet tried and there is no need to change the plan due to statistics change, the pending breaking changes are tried. The stored plan is tried to be preserved, but it may not be possible.

When breaking changes are tried, the execution should finish within 120% of the last execution time; otherwise, the execution is canceled and then re-executed after rolling back the breaking changes.

In the description above, the execution time comparison can be adjusted with a constant factor to consider fluctuation in measurement. If the cost of the same plan has been changed since the last execution, the last execution time needs to be scaled as much. Checking the cost change for scaling should be performed without enabling the breaking change since the breaking change may change the cost estimation. The execution time can be compared with the maximum of the last few execution times instead of the last execution time. The pending breaking changes can be tried a few times before it is determined to have failed.

To control the application of breaking changes, responsive plan engine 228 first associates a version number to each query. In addition, each breaking change needs to be guarded by a parameter that is associated with a version number. It is to activate it on compilation of a query only if the version number associated with the query is greater than the one associated with the parameter (assuming that the version is incremented after submission of all breaking changes). Responsive plan engine 228 also keeps the global last breaking change version information to determine whether there is any new breaking change with a new version.

After releasing a breaking change, the developer (e.g., a user) can check whether there are detected performance regressions and fix the issues if there are any with the change. The fix needs to be released as another breaking change so that it is tried together with the failed change later. The developer can also disable the change in the code by changing the default value and detaching the version number not to make it mixed with later breaking changes. Disabling the change immediately by setting the parameter in system or account level will also be possible. It will be useful when the change incurs issues like crash, but would not be useful for performance regression because it is already handled automatically. If there were false detections due to measurement fluctuation or infrastructure issues, the developer can enforce the application of the breaking changes.

The following discussion relates to performance regression techniques.

In some example, performance regression tracking can be a good addition to plan stability because the query matching for plan stability lays a foundation for it. If the binary versions between the previous and the current execution are different and the current execution is significantly slower than the previous one, responsive plan engine 228 can report it through usage tracking and logging. It can be reported together whether there was a plan change between the two runs so that the report can be filtered out depending on it. The binary version and the execution time are already recorded because they are needed to handle breaking changes. Being significantly slower can be defined as taking at least twice as much time.

If it is desirable not only to detect performance regression but also to roll back the change with it, responsive plan engine 228 can treat the change as if it is a breaking change. However, it will be desirable not to abuse the mechanism since it may make it difficult to analyze the detected performance regressions. It will be better to include only up to a few of such changes per release. Since the execution is cancelled in this case when a performance regression is detected, the execution cancellations instead of significant execution time increases will be reported through usage tracking and logging.

When a developer releases a feature that may affect performance, the developer checks whether there are performance regressions detected. Responsive plan engine 228 can also implement a dashboard for it so that a sudden spike in performance regression detection can be easily noticed. If there are, the developer should verify whether the regressions were caused by his or her changes. If there are regressions confirmed to be due to his or her changes, the developer can fix them. If the change was released as a breaking change to roll back the change with performance regression, the fix also is released as a breaking change as described above.

Responsive plan engine 228 can also think of filing JIRAs automatically with performance regression detection in an embodiment.

Candidate Query Selection

It is advantageous when responsive plan engine 228 can apply the plan stability to all queries, but it could be too costly. In an example, a reasonable compromise to mitigate computing costs (e.g., utilization of computing resources) could be tracking queries with the following properties:

Contains joins with table size larger than 1 million rows and has executed within a week Contains joins with table size larger than 1 billion rows and has executed within a month The 10 second threshold is from the assumption that the overhead could be kept under 1% if it takes less than 100 ms to access stored plans. The 10M rows, 10 seconds and 7 days are suggested default values for configurable parameters in some examples.

For shorter queries, responsive plan engine 228 will need an in-memory exemption set so that responsive plan engine 228 can skip them quickly. The exemption set does not need to be exact or shared between (virtual) warehouses. In addition, responsive plan engine 228 can manage only the parameterized versions of them.

Parameterized Matching

One way to support matching queries in a parameterized way is maintaining both unparameterized and parameterized entries per query. Another way is organizing unparameterized entries in two levels so that queries that are different only in constant values are clustered to each other. Embodiments of the subject technology uses the latter way since its space consumption could be lower.

Cost Estimation

To know when a plan change due to statistics change is needed, responsive plan engine 228 may generate a plan for it. This may incur an expensive cost-based optimization, but it could be fine since responsive plan engine 228 can save it from the actual plan generation if responsive plan engine 228 decides not to change the plan, which will be the common case. However, if it turns out not to be good enough, another strategy responsive plan engine 228 can take is comparing the costs with plans from greedy heuristics. Responsive plan engine 228 also need to try not to repeat important compilation steps before join ordering like scan set pruning by caching the results of the steps.

Execution Time Measurement

The issue of measuring the last execution time may get more complex than it looks if there are multiple types of warehouses under an account and the same query is executed in different types of warehouses. For such cases, responsive plan engine 228 will need to record the execution time per warehouse type. When checking the last execution time, if there is a record from a matching warehouse type, it is used. If not, one from the closest type can be used with scaling.

Temporary Table Handling

When there are structurally identical queries with different temporary tables, they will be treated as different queries. However, depending on the customer's application, they could be desirable to be treated as the same query. For example, a customer (PDX) drops and then recreates some tables using different names, and queries them using the same template everyday. One possible solution to the challenge could be an account-level parameter setting to specify a table name masking pattern. For example, responsive plan engine 228 can specify that the masking pattern is 6 or more consecutive digits using a regular expression and ignore that part on query matching.

The following is an example of plan information that can be stored in at least one embodiment.

Search slice:
Key information:
   Account ID
   Parameterized query text hash
   Query parameter values hash
Information to plan stability with manual plan selection,
   Plan hash
   Last used plan cost: this is also used for parameterized query matching
   Creation date
   Last used date
   Expiration date: extended on access
   Is parameterized matching enabled: a flag
   Is manually added: a flag
Information for automatic plan stability
   Plan change attempt count
   Execution history: a list of {warehouse size, a list of {job ID, cost, time}}
   Friction factor: MAX_VALUE can be used to avoid automatic plan change.
Information for handling breaking changes:
   Last used binary version
   Last rejected binary version
   Binary change attempt count
Optional information:
   Last job ID (e.g., for debugging purposes)

Figure 3:
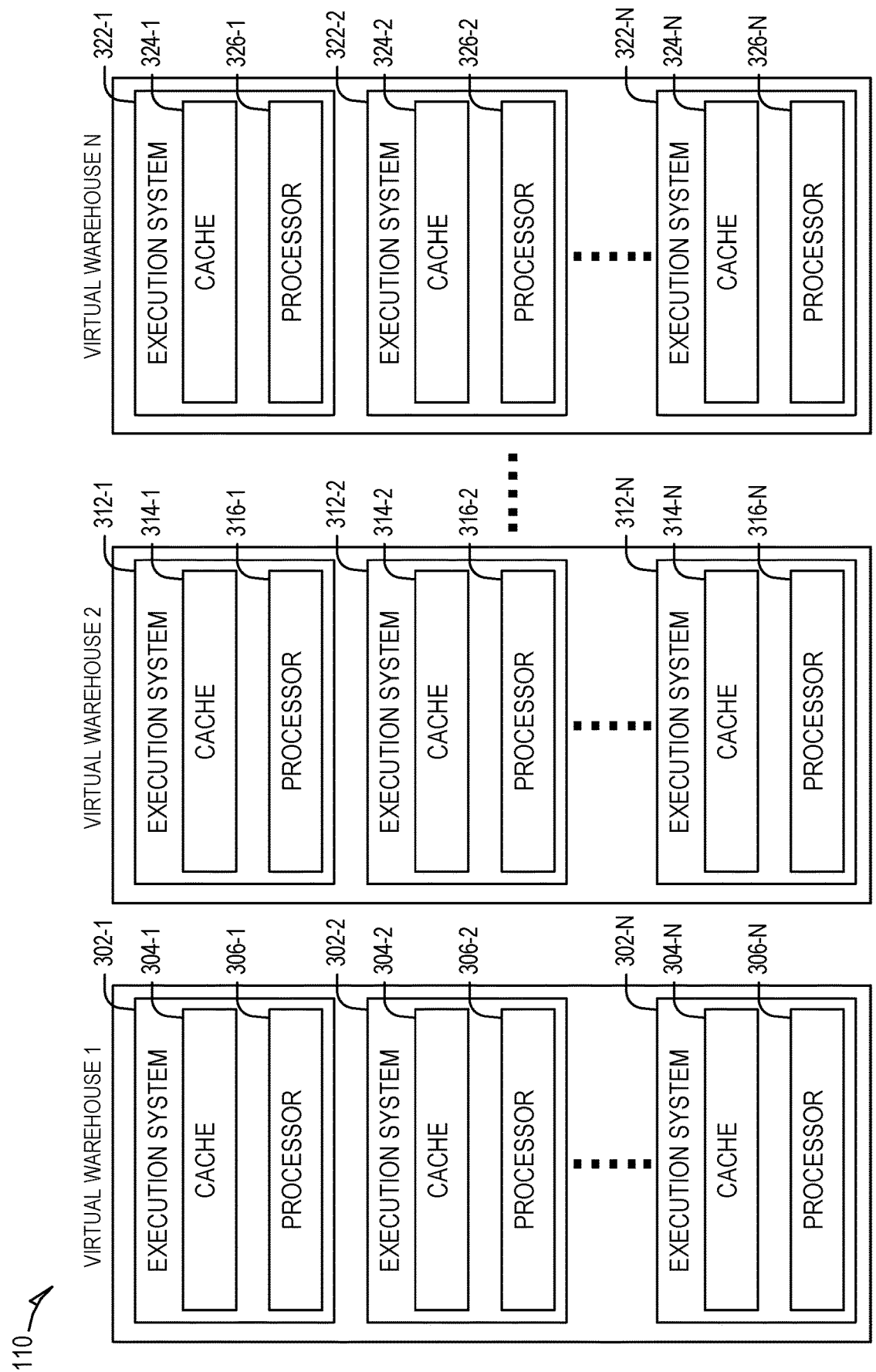
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted (e.g., shut down) when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without significantly impacting the performance observed by the existing users.

FIG. 4 is flow diagram illustrating operations of a database system in performing a method, in accordance with some embodiments of the present disclosure. The method 400 may be embodied in computer-readable instructions for execution by one or more hardware components (e.g., one or more processors) such that the operations of the method 400 may be performed by components of network-based data warehouse system 102, such as components of the compute service manager 108. Accordingly, the method 400 is described below, by way of example with reference thereto. However, it shall be appreciated that the method 400 may be deployed on various other hardware configurations and is not intended to be limited to deployment within the network-based data warehouse system 102.

At operation 402, the responsive plan engine 228 receives a first query plan corresponding to a first query, the first query plan comprising a new query plan different than a previous query plan for the first query. At operation 404, the responsive plan engine 228 determines a set of constants included in the first query. At operation 406, the responsive plan engine 228 identifies a second query plan, corresponding to a second query, the second query matching the first query and being different based on a second set of constants included in the second query. At operation 408, the responsive plan engine 228 executes the first query using the first query plan. At operation 410, the responsive plan engine 228 that a first execution time of the first query is greater than a second execution time of the second query. At operation 412, the responsive plan engine 228 ceases execution of the first query. At operation 414, the responsive plan engine 228 executes the first query using the previous query plan.

FIG. 5 is flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based data warehouse system 102, such as components of the compute service manager 108. Accordingly, the method 500 is described below, by way of example with reference thereto. However, it shall be appreciated that the method 500 may be deployed on various other hardware configurations and is not intended to be limited to deployment within the network-based data warehouse system 102.

At operation 502, the responsive plan engine 228 receives a first query plan corresponding to a first query, the first query plan comprising a new query plan different than a previous query plan for the first query. At operation 504, the responsive plan engine 228 determines a set of constants included in the first query. At operation 506, the responsive plan engine 228 determines a value indicating an estimated improvement in execution time of the first query plan in comparison to a previous execution time of the previous query plan. At operation 508, the responsive plan engine 228, in response to the value being greater than the threshold value, executes the first query using the first query plan.

FIG. 6 is flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based data warehouse system 102, such as components of the compute service manager 108. Accordingly, the method 600 is described below, by way of example with reference thereto. However, it shall be appreciated that the method 600 may be deployed on various other hardware configurations and is not intended to be limited to deployment within the network-based data warehouse system 102.

At operation 602, the responsive plan engine 228, during executing the first query, determines that a current execution time is greater than the previous execution time of the previous query plan. At operation 604, the responsive plan engine 228, in response to determining that the current execution time is greater than the previous execution time, ceases execution of the first query. At operation 606, the responsive plan engine 228 performs a rollback operation to switch back to the previous query plan for a subsequent execution of the first query. At operation 608, the responsive plan engine 228 increases the threshold value in response to performing the rollback operation.

FIG. 7 is flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based data warehouse system 102, such as components of the compute service manager 108. Accordingly, the method 700 is described below, by way of example with reference thereto. However, it shall be appreciated that the method 700 may be deployed on various other hardware configurations and is not intended to be limited to deployment within the network-based data warehouse system 102.

At operation 702, the responsive plan engine 228 determines a first set of constants in the first query plan. At operation 704, the responsive plan engine 228 determines a second set of constants in the previous query plan. At operation 706, the responsive plan engine 228 determines whether differences between the first set of constants and the second set of constants decrease an estimated execution time of the first query plan in comparison with the previous execution time of the previous query plan. At operation 708, the responsive plan engine 228 in response to determining that the first set of constants increase the estimated execution time of the first query plan, perform a rollback operation to switch back to the previous query plan for a subsequent execution of the first query.

Figure 8:
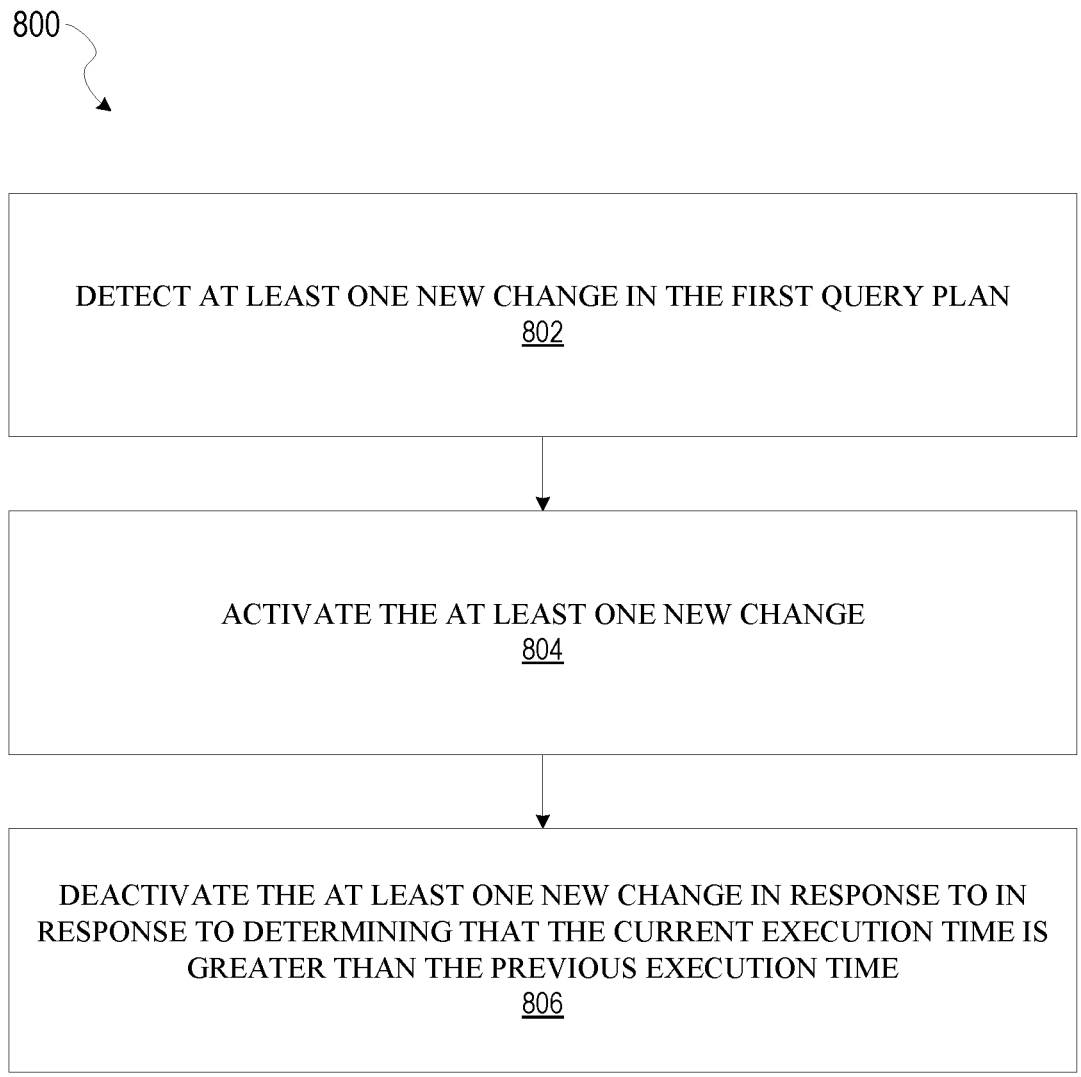
FIG. 8 is flow diagram illustrating operations of a database system in performing a method, in accordance with some embodiments of the present disclosure.

FIG. 8 is flow diagram illustrating operations of a database system in performing a method, in accordance with some embodiments of the present disclosure. The method 800 may be embodied in computer-readable instructions for execution by one or more hardware components (e.g., one or more processors) such that the operations of the method 800 may be performed by components of network-based data warehouse system 102, such as components of the compute service manager 108. Accordingly, the method 800 is described below, by way of example with reference thereto. However, it shall be appreciated that the method 800 may be deployed on various other hardware configurations and is not intended to be limited to deployment within the network-based data warehouse system 102.

At operation 802, the responsive plan engine 228 detects at least one new change in software for query plan generation, the software utilized at least in part for generating the first query plan. At operation 804, the responsive plan engine 228 activates the at least one new change. At operation 806, the responsive plan engine 228 deactivates the at least one new change in response to in response to determining that the current execution time is greater than the previous execution time.

Figure 9:
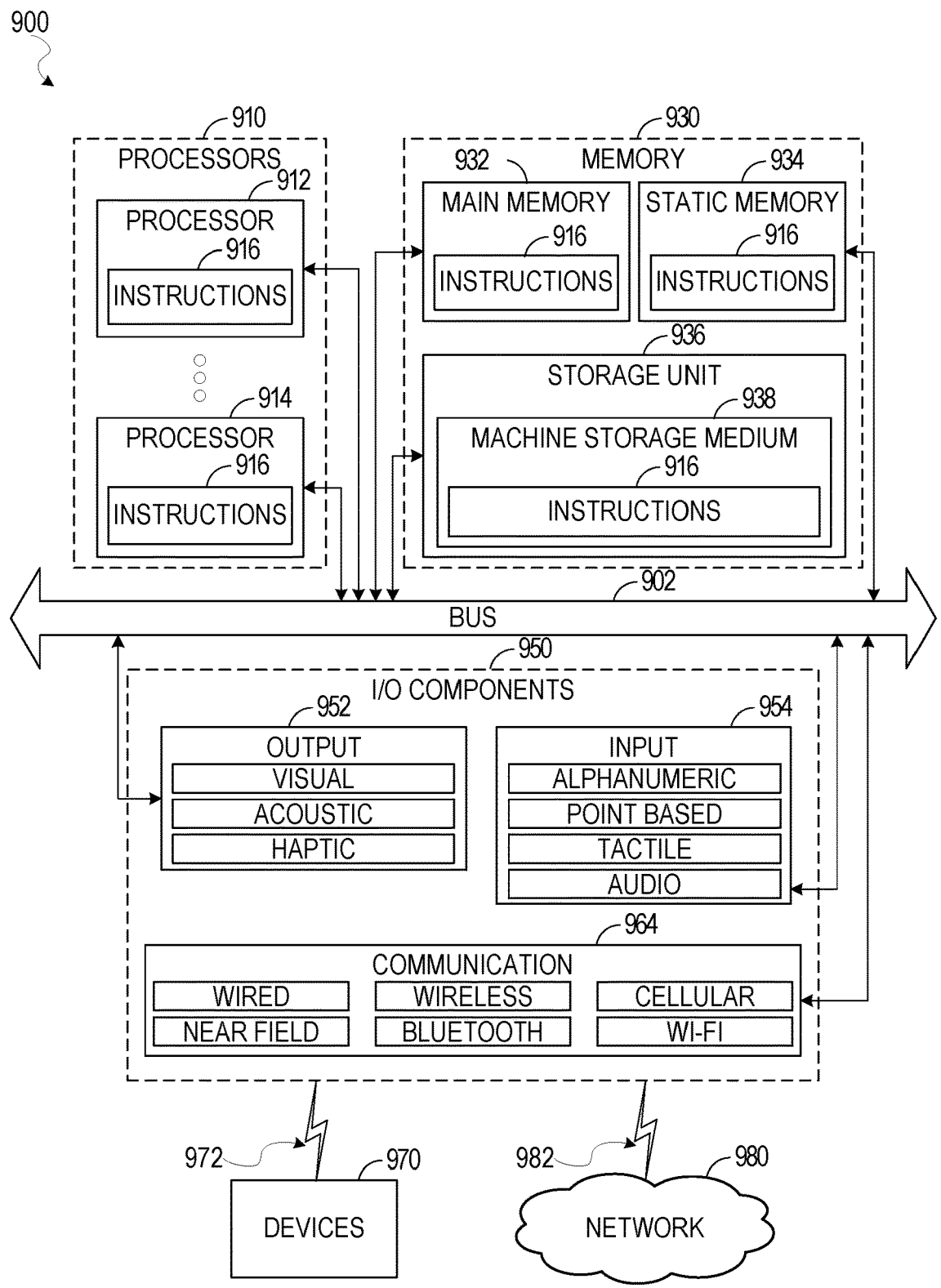
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of the method 400. In this way, the instructions 916 transform a general, non-programmed machine into a particular machine 900 (e.g., the compute service manager 108 or a node in the execution platform 110) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within machine storage medium 938 of the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the compute service manager 108 or the execution platform 110, and the devices 970 may include the client device 114 or any other computing device described herein as being in communication with the network-based data warehouse system 102 or the cloud storage platform 104.

Executable Instructions and Machine Storage Medium

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 400 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
a memory storing instructions that cause the at least one hardware processor to perform operations comprising:
receiving a first query plan corresponding to a first query, the first query plan comprising a new query plan different than a previous query plan for the first query, the receiving the first query plan comprising:
tracking a plurality of queries corresponding to a plurality of query plans based on join operations contained in each of the plurality of queries and a previous time of executing each query from the plurality of query plans, the previous query plan for the first query being included in the plurality of query plans, the join operations contained in each of the plurality of queries resulting in a table size larger than a particular number of rows and the previous time of executing each query falling within a particular period of time, and selecting the new query plan among the plurality of query plans;

determining a value indicating an estimated improvement in execution time of the first query plan in comparison to a previous execution time of the previous query plan; and in response to determining that the value is greater than a threshold value, attempting to execute the first query using the first query plan, the attempting comprising:

determining that a second query plan selected among a plurality of query plans has a second estimated execution time that is less than an estimated execution time of the first query plan; and executing the first query at a subsequent time using the second query plan, the executing the second query plan facilitating a decrease in execution time of the first query compared to using the first query plan.

2. The system of claim 1, wherein the operations further comprise:

during execution of the first query using the first query plan, determining whether a current execution time of the first query plan is reduced in comparison with the previous execution time of the previous query plan; and in response to determining that the current execution time is not reduced, cancelling the execution and re-executing the first query using the previous query plan.

3. The system of claim 2, wherein the operations further comprise:

in response to the determining that the current execution time is not reduced, performing a rollback operation to switch back to the previous query plan for a subsequent execution of the first query, and the operations further comprise:

increasing the threshold value in response to the performing the rollback operation.

4. The system of claim 1, wherein the determining the value comprises:

determining a first set of constants in the first query plan;

determining a second set of constants in the previous query plan; and determining the value based at least in part on differences between the first set of constants and the second set of constants decreasing an estimated execution time of the first query plan in comparison with the previous execution time of the previous query plan.

5. The system of claim 4, wherein the first query includes at least one constant value embedded in a first query string corresponding to the first query.

6. The system of claim 5, wherein the first set of constants includes the at least one constant value embedded in the first query string.

7. The system of claim 5, wherein the operations further comprise:

in response to determining that the first set of constants decrease the estimated execution time of the first query plan, selecting the first query plan instead of the previous query plan for execution.

8. The system of claim 7, wherein the operations further comprise:

detecting at least one new change in software for query plan selection, the software utilized at least in part for the selecting the new query plan; and activating the at least one new change.

9. The system of claim 8, wherein the operations further comprise:

deactivating the at least one new change in response to determining that a current execution time of the first query plan is greater than the previous execution time of the previous query plan.

10. The system of claim 1, wherein the table size comprises a million number of rows and the particular period of time comprises a week.

11. A method comprising:

receiving a first query plan corresponding to a first query, the first query plan comprising a new query plan different than a previous query plan for the first query, the receiving the first query plan comprising:

tracking a plurality of queries corresponding to a plurality of query plans based on join operations contained in each of the plurality of queries and a previous time of executing each query from the plurality of query plans, the previous query plan for the first query being included in the plurality of query plans, the join operations contained in each of the plurality of queries resulting in a table size larger than a particular number of rows and the previous time of executing each query falling within a particular period of time, and selecting the new query plan among the plurality of query plans;

determining a value indicating an estimated improvement in execution time of the first query plan in comparison to a previous execution time of the previous query plan; and in response to determining that the value is greater than a threshold value, attempting to execute the first query using the first query plan, the attempting comprising:

determining that a second query plan selected among a plurality of query plans has a second estimated execution time that is less than an estimated execution time of the first query plan; and executing the first query at a subsequent time using the second query plan, the executing the second query plan facilitating a decrease in execution time of the first query compared to using the first query plan.

12. The method of claim 11, further comprising:

during execution of the first query using the first query plan, determining whether a current execution time of the first query plan is reduced in comparison with the previous execution time of the previous query plan; and in response to determining that the current execution time is not reduced, cancelling the execution and re-executing the first query using the previous query plan.

13. The method of claim 12, further comprising:

in response to the determining that the current execution time is not reduced, performing a rollback operation to switch back to the previous query plan for a subsequent execution of the first query, and further comprising:

increasing the threshold value in response to the performing the rollback operation.

14. The method of claim 11, wherein the determining the value comprises:

determining a first set of constants in the first query plan;

determining a second set of constants in the previous query plan; and determining the value based at least in part on differences between the first set of constants and the second set of constants decreasing an estimated execution time of the first query plan in comparison with the previous execution time of the previous query plan.

15. The method of claim 14, wherein the first query includes at least one constant value embedded in a first query string corresponding to the first query.

16. The method of claim 15, wherein the first set of constants includes the at least one constant value embedded in the first query string.

17. The method of claim 15, further comprising:
in response to determining that the first set of constants decrease the estimated execution time of the first query plan, selecting the first query plan instead of the previous query plan for execution.

18. The method of claim 17, further comprising:
detecting at least one new change in software for query plan selection, the software utilized at least in part for the selecting the new query plan; and
activating the at least one new change.

19. The method of claim 18, further comprising:
deactivating the at least one new change in response to determining that a current execution time of the first query plan is greater than the previous execution time of the previous query plan.

20. The method of claim 11, wherein
the table size comprises a million number of rows and the particular period of time comprises a week.

21. A non-transitory computer-storage medium comprising instructions that, when executed by one or more processors of a machine, configure the machine to perform operations comprising:
receiving a first query plan corresponding to a first query, the first query plan comprising a new query plan different than a previous query plan for the first query, the receiving the first query plan comprising:
tracking a plurality of queries corresponding to a plurality of query plans based on join operations contained in each of the plurality of queries and a previous time of executing each query from the plurality of query plans, the previous query plan for the first query being included in the plurality of query plans, the join operations contained in each of the plurality of queries resulting in a table size larger than a particular number of rows and the previous time of executing each query falling within a particular period of time, and
selecting the new query plan among the plurality of query plans;
determining a value indicating an estimated improvement in execution time of the first query plan in comparison to a previous execution time of the previous query plan; and
in response to determining that the value is greater than a threshold value, attempting to execute the first query using the first query plan, the attempting comprising:
determining that a second query plan selected among a plurality of query plans has a second estimated execution time that is less than an estimated execution time of the first query plan; and
executing the first query at a subsequent time using the second query plan, the executing the second query plan facilitating a decrease in execution time of the first query compared to using the first query plan.

22. The non-transitory computer-storage medium claim 21, wherein the operations further comprise:
during execution of the first query using the first query plan, determining whether a current execution time of the first query plan is reduced in comparison with the previous execution time of the previous query plan; and
in response to determining that the current execution time is not reduced, cancelling the execution and re-executing the first query using the previous query plan.

23. The non-transitory computer-storage medium claim 22, wherein the operations further comprise:
in response to the determining that the current execution time is not reduced, performing a rollback operation to switch back to the previous query plan for a subsequent execution of the first query, and the operations further comprise:
increasing the threshold value in response to the performing the rollback operation.

24. The non-transitory computer-storage medium claim 21, wherein the determining the value comprises:
determining a first set of constants in the first query plan;
determining a second set of constants in the previous query plan; and
determining the value based at least in part on differences between the first set of constants and the second set of constants decreasing an estimated execution time of the first query plan in comparison with the previous execution time of the previous query plan.

25. The non-transitory computer-storage medium claim 24, wherein the first query includes at least one constant value embedded in a first query string corresponding to the first query.

26. The non-transitory computer-storage medium claim 25, wherein the first set of constants includes the at least one constant value embedded in the first query string.

27. The non-transitory computer-storage medium claim 25, wherein the operations further comprise:
in response to determining that the first set of constants decrease the estimated execution time of the first query plan, selecting the first query plan instead of the previous query plan for execution.

28. The non-transitory computer-storage medium claim 27, wherein the operations further comprise:
detecting at least one new change in software for query plan selection, the software utilized at least in part for the selecting the new query plan; and
activating the at least one new change.

29. The non-transitory computer-storage medium claim 28, wherein the operations further comprise:
deactivating the at least one new change in response to determining that a current execution time of the first query plan is greater than the previous execution time of the previous query plan.

30. The non-transitory computer-storage medium claim 21, wherein
the table size comprises a million number of rows and the particular period of time comprises a week.

* * * * *